United States Patent
Oka et al.

(10) Patent No.: US 10,511,021 B2
(45) Date of Patent: Dec. 17, 2019

(54) NON-AQUEOUS ELECTROLYTE SECONDARY BATTERY

(71) Applicant: Sanyo Electric Co., Ltd., Daito-shi, Osaka (JP)

(72) Inventors: Takaaki Oka, Osaka (JP); Kaoru Nagata, Osaka (JP); Manabu Takijiri, Osaka (JP); Takeshi Ogasawara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 261 days.

(21) Appl. No.: 15/126,052

(22) PCT Filed: Mar. 10, 2015

(86) PCT No.: PCT/JP2015/001293
§ 371 (c)(1),
(2) Date: Sep. 14, 2016

(87) PCT Pub. No.: WO2015/141179
PCT Pub. Date: Sep. 24, 2015

(65) Prior Publication Data
US 2017/0084916 A1   Mar. 23, 2017

(30) Foreign Application Priority Data

Mar. 17, 2014  (JP) ................. 2014-053066

(51) Int. Cl.
| | |
|---|---|
| *H01M 4/525* | (2010.01) |
| *H01M 4/505* | (2010.01) |
| *H01M 10/052* | (2010.01) |
| *H01M 10/0567* | (2010.01) |
| *H01M 4/36* | (2006.01) |
| *H01M 10/0568* | (2010.01) |
| *H01M 10/0525* | (2010.01) |
| *H01M 4/02* | (2006.01) |

(52) U.S. Cl.
CPC .......... *H01M 4/525* (2013.01); *H01M 4/366* (2013.01); *H01M 4/505* (2013.01); *H01M 10/052* (2013.01); *H01M 10/0525* (2013.01); *H01M 10/0567* (2013.01); *H01M 10/0568* (2013.01); *H01M 2004/028* (2013.01); *Y02T 10/7011* (2013.01)

(58) Field of Classification Search
CPC .. H01M 10/0568; H01M 4/366; H01M 4/505; H01M 4/525; H01M 10/052; H01M 10/0567; H01M 10/0525; H01M 2004/028; Y02T 10/7011
See application file for complete search history.

(56) References Cited

U.S. PATENT DOCUMENTS

| | | | |
|---|---|---|---|
| 2008/0233481 A1 | 9/2008 | Kuzuo et al. | |
| 2009/0057137 A1* | 3/2009 | Pitts ................. | C23C 14/08 204/192.15 |
| 2010/0209771 A1* | 8/2010 | Shizuka ............. | B82Y 30/00 429/207 |
| 2011/0104569 A1* | 5/2011 | Sugaya .............. | H01M 4/131 429/220 |
| 2011/0151283 A1 | 6/2011 | Gillaspie et al. | |
| 2011/0200876 A1 | 8/2011 | Park | |
| 2012/0292561 A1 | 11/2012 | Sasaoka et al. | |
| 2014/0329146 A1 | 11/2014 | Niina et al. | |
| 2015/0021518 A1 | 1/2015 | Kokado et al. | |
| 2015/0056512 A1* | 2/2015 | Takeuchi ........... | H01M 4/131 429/223 |

FOREIGN PATENT DOCUMENTS

| | | | |
|---|---|---|---|
| EP | 0848435 | * | 6/1998 |
| JP | 11-67270 A | | 3/1999 |
| JP | 2001-216965 A | | 8/2001 |
| JP | 2002-075367 A | | 3/2002 |
| JP | 2005-251716 A | | 9/2005 |
| JP | 2008-218122 A | | 9/2008 |
| JP | 2012-134137 A | | 7/2012 |
| JP | 2012-178312 A | | 9/2012 |
| JP | 2013-152866 A | | 8/2013 |
| WO | 2009/029111 A1 | | 3/2009 |
| WO | 2011/089958 A1 | | 7/2011 |
| WO | 2013/015069 A1 | | 1/2013 |
| WO | 2013/094465 A1 | | 6/2013 |
| WO | 2013/125426 A1 | | 8/2013 |
| WO | 2013/145846 A1 | | 10/2013 |
| WO | WO/2013/145846 | * | 10/2013 |

OTHER PUBLICATIONS

International Search Report dated Jun. 9, 2015, issued in counterpart International Application No. PCT/JP2015/001293 (2 pages).

* cited by examiner

*Primary Examiner* — Alexander Usyatinsky
(74) *Attorney, Agent, or Firm* — Westerman, Hattori, Daniels & Adrian, LLP

(57) ABSTRACT

A nonaqueous electrolyte secondary battery has both high capacity and high regeneration. A nonaqueous electrolyte secondary battery includes a positive electrode, a negative electrode, and a nonaqueous electrolyte. The positive electrode contains a Ni-containing lithium transition metal oxide having a layered structure and also contains a tungsten compound and/or a molybdenum compound. The percentage of Ni is greater than 90 mole percent with respect to the molar amount of the lithium transition metal oxide. The amount of the compound is 0.1 mole percent to 1.5 mole percent with respect to the molar amount of the lithium transition metal oxide in terms of tungsten element and/or molybdenum element.

13 Claims, 1 Drawing Sheet

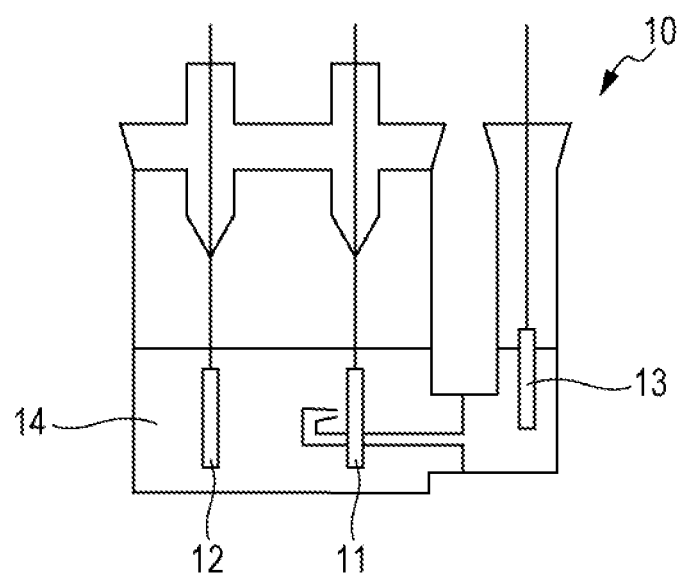

NON-AQUEOUS ELECTROLYTE SECONDARY BATTERY

TECHNICAL FIELD

The present invention relates to a nonaqueous electrolyte secondary battery.

BACKGROUND ART

In recent years, smaller and lighter mobile data terminals such as mobile phones, notebook personal computers, and smartphones have been increasingly used and batteries used as driving power supplies therefor have been required to nave higher capacity. Nonaqueous electrolyte secondary batteries, which are charged and discharged in such a manner that lithium ions move between positive and negative electrodes in association with charge and discharge, have high energy density and high capacity and therefore are widely used as driving power supplies for the above mobile data terminals.

Furthermore, the nonaqueous electrolyte secondary batteries are recently attracting attention as driving power supplies for electric vehicles, electric tools, and the like and applications thereof are expected to be further expanded. Such on-vehicle/driving power supplies are required to have high capacity so as to be used for a long time and high power characteristics. Furthermore, particularly in on-vehicle applications, quick charge is increasingly demanded and both high capacity and high regeneration are required to be achieved.

Herein, as a method for increasing the capacity and power of a battery, for example, Patent Literature 1 proposes a positive electrode active material for nonaqueous electrolyte secondary batteries. In the positive electrode active material, the Li site occupancy of a Li site in a crystal is regulated to 98.5% or more and the metal site occupancy of a metal site is regulated to 95% to 98%.

On the other hand, Patent Literature 2 suggests that discharge capacity and thermal stability are increased using a positive electrode active material represented by the formula $Li_{1.1+x}Ni_aM^1_bM^2_cO_2$ (where $M^1$ includes at least either of Mo and W, $M^2$ is Mn, $-0.07 \leq x \leq 0.1$, $0.90 \leq a \leq 0.98$, $0.02 \leq b \leq 0.06$, and $0.00 \leq c \leq 0.06$).

CITATION LIST

Patent Literature

PTL 1: Japanese Published Unexamined Patent Application No. 2008-218122

PTL 2: Japanese Published Unexamined Patent Application No. 2012-178312

SUMMARY OF INVENTION

Technical Problem

However, in Patent Literatures 1 and 2, there is a problem in that both of high capacity and high regenerative characteristics cannot be achieved. In an aspect of the present invention, it is an object to provide a nonaqueous electrolyte secondary battery with both high capacity and high regenerative characteristics.

Solution to Problem

In order to solve the above problem, a nonaqueous electrolyte secondary battery according to an embodiment of the present invention includes a positive electrode, a negative electrode, and a nonaqueous electrolyte. The positive electrode contains a lithium transition metal oxide, having a layered structure, containing at least Ni and also contains a tungsten compound and/or a molybdenum compound. The percentage of Ni is greater than 90 mole percent with respect to the sum of the molar amounts of metal elements, excluding lithium, in the lithium transition metal oxide. The amount of the tungsten compound and/or the molybdenum compound is 0.1 mole percent to 1.5 mole percent with respect to the sum of the molar amounts of the metal elements, excluding lithium, in the lithium transition metal oxide in terms of tungsten element and/or molybdenum element.

Advantageous Effects of Invention

In accordance with a nonaqueous electrolyte secondary battery according to an embodiment of the present invention, regenerative characteristics can be enhanced with high capacity maintained.

BRIEF DESCRIPTION OF DRAWING

FIG. 1 is a schematic view illustrating the schematic structure of a three-electrode test cell according to an embodiment of the present invention.

DESCRIPTION OF EMBODIMENTS

An embodiment of the present invention is described below. This embodiment is an example for carrying out the present invention. The present invention is not limited to this embodiment. Modifications can be made without departing from the spirit of the present invention. The drawing referred to in the description of this embodiment is schematic and therefore the size and the like of components depicted in the drawing are different from those of actual components in some cases.

The inventors have carried out investigations and have found a problem that although increasing the percentage of Ni element in a lithium transition metal oxide used as a positive electrode active material is effective in increasing the capacity of batteries as described in Patent Literature 2, increasing the percentage of Ni element reduces regenerative characteristics. That is, increasing the percentage of Ni element in the lithium transition metal oxide enables high capacity and, however, reduces regenerative characteristics; hence, it is difficult to achieve both high capacity and high regeneration.

Therefore, a nonaqueous electrolyte secondary battery that is an example of this embodiment includes a positive electrode, a negative electrode, and a nonaqueous electrolyte. The positive electrode contains a lithium transition metal oxide, having a layered structure, containing at least Ni and also contains a tungsten compound and/or a molybdenum compound. The percentage of Ni is greater than 90 mole percent with respect to the sum of the molar amounts of metal elements, excluding lithium, in the lithium transition metal oxide. The amount of the tungsten compound and/or the molybdenum compound is 0.1 mole percent to 1.5 mole percent with respect to the sum of the molar amounts of the metal elements, excluding lithium, in the lithium transition metal oxide in terms of tungsten element and/or molybdenum element.

The lithium transition metal oxide, which has a Ni percentage of more than 90 mole percent, is likely to be in such a state that two hexagonal phases are present because the crystal structure transforms (phase transition) when the amount of Li in a Li site ranges from 0 to 0.3. Since the phase transition occurs at a high potential of 4.15 V to 4.25 V versus lithium, the time that the positive electrode is held at a high potential is long and therefore the oxidative degradation reaction of the nonaqueous electrolyte is promoted on the surface of the lithium transition metal oxide. This allows resistive coatings, due to a degradation product, having low lithium ion permeability to be formed on the surfaces of particles of the lithium transition metal oxide, resulting in reductions in regenerative characteristics.

However, since the positive electrode contains the tungsten compound and/or the molybdenum compound, even though phase transition occurs at a high potential as described above and the time that the electrode is held at a high potential is long, the formation of the resistive coatings, which have low lithium ion permeability, on the surfaces of the lithium transition metal oxide particles is suppressed. This is because since the tungsten compound and/or the molybdenum compound is contained in the positive electrode and is present near the surfaces of the lithium transition metal oxide particles, the tungsten compound and/or the molybdenum compound interacts and reacts with the nonaqueous electrolyte to form good coatings with excellent lithium ion permeability on the surfaces of the lithium transition metal oxide particles. As a result, regenerative characteristics are enhanced. That is, even though the percentage of Ni is increased for the purpose of high capacity, the reduction of regenerative characteristics due to the increase of the percentage of Ni is suppressed because the positive electrode contains the tungsten compound and/or the molybdenum compound; hence, both high capacity and high regeneration can be achieved.

The percentage of Ni needs to be greater than 90 mole percent with respect to the sum of the molar amounts of the metal elements, excluding lithium, in the lithium transition metal oxide. This is because when the percentage of Ni is greater than 90 mole percent, the phase transition of the lithium transition metal oxide occurs at a high potential as described above and therefore good coatings with excellent lithium ion permeability are formed on the surfaces of the lithium transition metal oxide particles. However, when the percentage of Ni is 90 mole percent or less, the time that the positive electrode is held at a high potential is short and therefore the good coatings with excellent lithium ion permeability cannot be formed. In addition, when the percentage of Ni is 90 mole percent or less, the tungsten compound and/or the molybdenum compound remains on the surface of the lithium transition metal oxide without interacting with the nonaqueous electrolyte and therefore serves as a resistive component to reduce regenerative characteristics. Furthermore, regenerative characteristics are reduced by forming resistive coatings with low lithium ion permeability on the surface of the lithium transition metal oxide by the oxidative degradation reaction of a conventional nonaqueous electrolyte solution.

The phase transition of the lithium transition metal oxide preferably occurs at a potential of 4.15 V (vs. Li/Li$^+$) to 4.25 V (vs. Li/Li+) versus lithium. This is because the use of the above phase transition region for charge and discharge allows the capacity of the battery to be significantly increased and also allows the effect of forming the good coatings to be obtained.

The tungsten compound and/or the molybdenum compound may be contained in the positive electrode. The tungsten compound and/or the molybdenum compound may be present near the surface of the lithium transition metal oxide. From the viewpoint that the effect of enhancing regenerative characteristics is further exhibited, the tungsten compound and/or the molybdenum compound is preferably attached to the surface of the lithium transition metal oxide. The tungsten compound and/or the molybdenum compound is preferably attached to a portion of the surface of the lithium transition metal oxide. That is, it is preferable that the tungsten compound and/or the molybdenum compound does not cover the whole surface of the lithium transition metal oxide but the surface thereof is partly exposed. This is because if the whole surface thereof is covered, the surface of the lithium transition metal oxide is excessively covered by the tungsten compound and/or the molybdenum compound and therefore the compounds serve as resistors to reduce regenerative characteristics.

Herein, the term "attached" includes a state that the tungsten compound and/or the molybdenum compound is simply physically attached to the surface of the lithium transition metal oxide and a state that a portion of the tungsten compound and/or the molybdenum compound is diffused (forms a solid solution) in the lithium transition metal oxide.

The lithium transition metal oxide is preferably composed of secondary particles formed by the aggregation of primary particles. The tungsten compound and/or the molybdenum compound is preferably attached to the surfaces of at least either of the primary particles and secondary particles of the lithium transition metal oxide and is particularly preferably attached to the surfaces of both of the primary particles and secondary particles thereof. This is because when the tungsten compound and/or the molybdenum compound is attached to the surfaces of both of the primary particles and secondary particles of the lithium transition metal oxide, the good coatings are formed not only on the surfaces of the secondary particles but also on the surfaces of the primary particles, which are present in the secondary particles, and therefore the effect of enhancing regenerative characteristics is further exhibited.

Incidentally, the expression "attached to the surfaces of the secondary particles of the lithium transition metal oxide" means that the tungsten compound and/or the molybdenum compound is attached to the surfaces of secondary particles and the surfaces of primary particles forming the secondary particles. Furthermore, the expression "attached to the surfaces of the primary particles of the lithium transition metal oxide" means that the tungsten compound and/or the molybdenum compound is not attached to the surfaces of secondary particles but is attached to the surfaces of primary particles which are in the secondary particles and which form the secondary particles.

The amount of the tungsten compound and/or molybdenum compound contained in the positive electrode is preferably 0.1 mole percent to 1.5 mole percent with respect to the sum of the molar amounts of metals, excluding lithium, in the lithium transition metal oxide, which is contained in the positive electrode, in terms of tungsten element and/or molybdenum element. This is because when the percentage is less than 0.1 mole percent, an effect due to the tungsten compound and/or the molybdenum compound, which is contained in the positive electrode, is not sufficiently exhibited. However, when the percentage is more than 1.5 mole percent, the lithium ion permeability of coatings is low and regenerative characteristics are low.

The type of the tungsten compound arid/or the molybdenum compound is not particularly limited. The following compounds are cited: for example, oxides, lithium composite oxides, borides, carbides, silicides, sulfides, chlorides, and the like containing tungsten and/or molybdenum. At least one compound selected from the oxides and the lithium composite oxides is particularly preferable. In particular, the following compounds are cited: tungsten oxide, lithium tungstate, sodium tungstate, magnesium tungstate, potassium tungstate, silver tungstate, tungsten boride, tungsten carbide, tungsten silicide, tungsten sulfide, tungsten chloride, molybdenum oxide, lithium molybdate, sodium molybdate, molybdenum carbide, molybdenum chloride, and the like. A mixture of two or more of these compounds may be used.

A method for allowing the positive electrode to contain the tungsten compound and/or the molybdenum compound is not particularly limited. In particular, the following methods are cited: a method in which the tungsten compound and/or the molybdenum compound is added to and mixed with the fired lithium transition metal oxide and the obtained mixture is fired as required and a method in which a lithium compound and transition metal oxide used as raw materials are mixed with the tungsten compound and/or the molybdenum compound, followed by firing. In the case of using the latter method, the tungsten compound and/or the molybdenum compound is attached not only to the surfaces of the secondary particles of the lithium transition metal oxide but also to the surfaces of primary particles in the secondary particles. Therefore, this method is more preferable. Furthermore, the following method can be used: a method in which the tungsten compound and/or the molybdenum compound is mixed with a positive electrode active material, a conductive agent, and the like in the preparation of positive electrode mix slurry.

The type of the lithium compound is not particularly limited. For example, at least one or more selected from lithium hydroxide, lithium carbonate, lithium chloride, lithium sulfate, sodium acetate, and hydrates of these compounds can be used. In particular, lithium hydroxide is preferably used. The firing temperature of the raw materials varies depending on the composition or particle size of a transition metal oxide which is a raw material. The firing temperature generally ranges from 500° C. to 1,000° C., preferably 600° to 900° C., and more preferably 700° C. to 800° C.

The lithium transition metal oxide is used as a positive electrode active material. The lithium transition metal oxide contains lithium, nickel, and an oxide containing a metal element M. The metal element M preferably includes at least one metal element selected from transition metal elements such as cobalt and manganese and non-transition metal elements such as aluminium and magnesium. For example, Li transition metal oxides of Ni—Co—Mn, Ni—Mn—Al, Ni—Co—Al, and the like are cited. In particular, from the viewpoint of high capacity and the viewpoint of increasing cycle characteristics and thermal stability, a Li transition metal oxide of Ni—Co—Al is preferable. Examples of the lithium transition metal oxide include $LiNi_{0.91}Co_{0.06}Al_{0.03}O_2$, $LiNi_{0.91}Co_{0.06}Mn_{0.03}O_2$, and $LiNi_{0.91}Mn_{0.06}Al_{0.03}O_2$. The lithium transition metal oxide may be one in which oxygen is partially substituted with fluorine or the like. The lithium transition metal oxide may be one of these compounds or a mixture of two or more of these compounds.

The lithium transition metal oxide may further contain at least one additive element selected from the group consisting of titanium, chromium, vanadium, iron, copper, zinc, niobium, zirconium, tin, sodium, and potassium.

The lithium transition metal oxide used is more preferably an oxide represented by the formula $Li_aNi_xM_{1-x}O_2$ (where $0.95 \le a \le 1.20$, $0.90 < x$, and M is at least one element selected from Co, Mn, and Al).

The lithium transition metal oxide used is particularly preferably an oxide represented by the formula $Li_aNi_xCo_yAl_zO_2$ (where $0.95 \le a \le 1.20$, $0.90 < x$, $0 < y < 0.10$, and $0 < z < 0.10$).

When the composition ratio a of Li is less than 0.95 or is more than 1.20, the capacity is low, The nonaqueous electrolyte preferably contains a lithium salt, such as a phosphate, containing a P—O bond in its molecule as an additive (the lithium salt is referred to as the "lithium salt as an additive" in some cases for the purpose of distinguishing the lithium salt from a lithium salt below as a solute) and/or a nitrile compound containing a C—N bond in its molecule.

This is because when the nonaqueous electrolyte contains the lithium salt, which contains the P—O bond in its molecule, and/or the nitrile compound, which contains the C—N bond in its molecule, unsaturated bonds contained in these additives react with the tungsten compound present near the surfaces of the lithium transition metal oxide particles in a phase transition region of 4.15 V to 4.25 V (vs. $Li/Li^+$) to form good coatings with both electronic conductivity and lithium ion permeability on the surfaces of the lithium transition metal oxide particles. This further increases the effect of enhancing regenerative characteristics.

Examples of the lithium salt, which contains the P—O bond in its molecule, include lithium difluorophosphate ($LiPO_2F_2$), lithium monofluorophosphate ($Li_2PO_3F$), lithium tetrafluorooxalatophosphate ($Li[P(C_2O_4)F_4]$), and lithium difluorooxalatophosphate ($Li[P(C_2O_4)2F_2]$). In particular, lithium difluorophosphate and lithium monofluorophosphate are preferable. Lithium difluorophosphate is particularly preferable.

Examples of the nitrile compound include adiponitrile, succinonitrile, pimelonitrile, butyronitrile, valeronitrile, n-heptanenitrile, glutaronitrile, 1,2,3-propanetricarbonitrile, and 1,3,5-pentanetricarbonitrile. In particular, dinitrile compounds are preferable. Adiponitrile, succinonitrile, and pimelonitrile are more preferable. Adiponitrile is particularly preferable.

The percentage of the lithium salt as an additive is preferably 0.1 mass percent to 10 mass percent, more preferably 0.3 mass percent to 8 mass percent, and particularly preferably 0.5 mass percent to 5 mass percent with respect to the mass of the nonaqueous electrolyte.

The percentage of the nitrile compound as an additive is preferably 0.1 mass percent to 10 mass percent and more preferably 0.5 mass percent to 5 mass percent with respect to the mass of the nonaqueous electrolyte.

When the amount of the lithium salt as an additive or the nitrile compound is too small, the good coatings with both electronic conductivity and lithium ion permeability are not sufficiently formed and the effect of enhancing regenerative characteristics is low. However, when the amount of the lithium salt as an additive or the nitrile compound is too large, the ionic conductivity of an electrolyte solution is low and regenerative characteristics are low.

The positive electrode includes a positive electrode current collector and a positive electrode mix layer placed on the positive electrode current collector. The positive electrode mix layer preferably contains a carbon material such as carbon black as a conductive agent and particularly preferably contains acetylene black as a conductive agent. The percentage of a conductive agent is preferably 0.5 mass percent to 1.5 mass percent with respect to the whole of the positive electrode mix layer. When the percentage thereof is too small, the electronic resistance of the positive electrode mix layer is large and regenerative characteristics are low. However, when the percentage thereof is too large, the percentage of a positive electrode active material in the positive electrode mix layer is low and therefore the capacity is low.

(Other items)

(1) A solvent for the nonaqueous electrolyte is not particularly limited and may be one conventionally used in nonaqueous electrolyte secondary batteries. For example, the following compounds can be used: cyclic carbonates such as ethylene carbonate, propylene carbonate, butylene carbonate, and vinylene carbonate; linear carbonates such as dimethyl carbonate, ethyl methyl carbonate, and diethyl carbonate; compounds including esters such as methyl acetate, ethyl acetate, propyl acetate, methyl propionate, ethyl propionate, and γ-butyrolactone; sulfo group-containing compounds such as propanesulfone; compounds including ethers such as 1,2-dimethoxyethane, 1,2-diethoxyethane, tetrahydrofuran, 1,3-dioxane, 1,4-dioxane, and 2-methyl tetrahydrofuran; and compounds including amides such as dimethylformamide. In particular, a solvent in which H is partially substituted with F is preferably used. These compounds can be used alone or in combination. In particular, a solvent containing a combination of a cyclic carbonate and a linear carbonate and a solvent containing a combination of these carbonates and a small amount of ether are preferable.

An ionic liquid can be used as a nonaqueous solvent for the nonaqueous electrolyte. In this case, a cation species and an anion species are not particularly limited. From the viewpoint of low viscosity, electrochemical stability, and hydrophobicity, a combination of a cation such as a pyridinium cation, an imidazolium cation, or a quaternary ammonium cation and an anion such as a fluorine-containing imide anion is particularly preferable.

Furthermore, a solute used in the nonaqueous electrolyte may be a known lithium salt (the lithium salt as a solute) generally used in conventional nonaqueous electrolyte secondary batteries. Such a lithium salt may be a lithium salt containing one or more elements of P, B, F, O, S, N, and Cl. In particular, the following salts and mixtures can be used: lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, and $LiClO_4$ and mixtures of these lithium salts. In order to enhance high-rate charge/discharge characteristics of the nonaqueous electrolyte secondary battery, $LiPF_6$ is preferably used. The concentration of the solute used in the nonaqueous electrolyte is not particularly limited and is preferably 0.8 moles to 1.7 moles per liter of a nonaqueous electrolyte solution. Furthermore, for applications needing large-current discharge, the concentration of the solute is preferably 1.0 mole to 1.6 moles per liter of the nonaqueous electrolyte solution.

(2) A negative electrode active material is not particularly limited and may be capable of reversibly storing and releasing lithium. For example, a carbon material, a metal alloyed with lithium, an alloy material containing the metal, a metal oxide containing the metal, or the like can be used. From the viewpoint of material costs, the negative electrode active material used is preferably the carbon material. For example, natural graphite, synthetic graphite, mesophase pitch-based carbon fibers (MCFs), meso-carbon microbeads (MCMBs), coke, hard carbon, or the like can be used. In particular, from the viewpoint of enhancing high-rate charge/discharge characteristics, the negative electrode active material used is preferably a carbon material prepared by coating a graphitic material with low-crystallinity carbon. The metal alloyed with lithium is preferably silicon or tin. The negative electrode active material used may be, for example, a silicon oxide ($SiO_x$ (0<x<2) besides silicon and a silicon alloy. Alternatively, the negative electrode active material used may be a mixture of the carbon material and the metal alloyed with lithium or a mixture of the alloy material and the metal oxide.

(3) A separator is preferably placed between the positive electrode and the negative electrode. The separator used may be one conventionally used. In particular, a separator made of polyethylene, a separator including a polypropylene layer formed on polyethylene, or a polyethylene separator surface-coated with an aramid resin or the like may be used.

(4) A layer containing an inorganic filler conventionally used may be formed between the separator and the positive electrode or the negative electrode. The filler used may be an oxide or phosphoric acid compound, containing one or some of titanium, aluminium, silicon, and magnesium, conventionally used or may be one surface-treated with a hydroxide or the like. The filler layer can be formed in such a manner that filler-containing slurry is directly applied to the positive electrode, the negative electrode, or the separator; in such a manner that a sheet formed from the filler is attached to the positive electrode, the negative electrode, or the separator; or in a similar manner:

A nonaqueous electrolyte secondary battery according to an embodiment of the present invention is described below in detail using various experiment examples. The experiment examples below are exemplified in order to illustrate an example of the nonaqueous electrolyte secondary battery for the purpose of embodying the technical spirit of the present invention. It is not intended to limit the present invention to any of these experiment examples. Appropriate modifications can be made without departing from the gist thereof.

FIRST EXPERIMENT EXAMPLE (Experiment Example 1)
[Preparation of Positive Electrode Active Material]

Tungsten oxide ($WO_3$) was added to and mixed with particles of lithium nickel-cobalt-aluminate, represented by $LiNi_{0.91}Co_{0.06}Al_{0.03}O_2$, having a layered structure as a lithium transition metal oxide in a predetermined proportion, whereby a positive electrode active material made of lithium nickel-cobalt-aluminate containing a tungsten compound was obtained. The amount of the added tungsten compound was 0.15 mole percent with respect to the sum of the molar amounts of metal elements, excluding lithium, in the lithium nickel-cobalt-aluminate in terms of tungsten element.

[Preparation of Positive Electrode]

Next, one part by mass of acetylene black serving as a conductive agent and 0.9 parts by mass of polyvinylidene fluoride serving as a binder were mixed with 100 parts by mass of the positive electrode active material, followed by adding an adequate amount of NMP (N-methyl-2-pyrrolidone) to the mixture, whereby positive electrode mix slurry was prepared. Next, the positive electrode mix slurry was applied to a surface of a positive electrode current-collector made of aluminium and was then dried, whereby a positive electrode mix layer was formed on the positive electrode current collector. Finally, the positive electrode current collector was cut to a predetermined electrode size and was then rolled using a roller, followed by attaching a positive electrode current collector tab to the positive electrode current collector, whereby a positive electrode was prepared.

The positive electrode prepared as described above contained the tungsten compound ($WO_3$). The amount of $WO_3$ was 0.15 mole percent with respect to the sum of the molar amounts of the metal elements, excluding lithium, in the lithium transition metal oxide contained in the positive electrode in terms of tungsten element.

[Preparation of Three-Electrode Test Cell]

A three-electrode test cell 10 shown in FIG. 1 was prepared. In this operation, the positive electrode was used as a working electrode 11 and metallic lithium was used in a counter electrode 12 serving as a negative electrode and a reference electrode 13. A nonaqueous electrolyte solution 14 used was one that was prepared in such a manner that a solvent mixture was prepared by mixing ethylene carbonate, ethyl methyl carbonate, and dimethyl carbonate at a volume ratio of 30:30:40, $LiPF_6$ was dissolved in the solvent mixture such that the concentration of $LiPF_6$ was 1.0 mole per liter, and 1 mass percent of vinylene carbonate was further dissolved.

The cell prepared as described above is hereinafter referred to as Battery A1.

(Experiment Example 2)

A cell was prepared in substantially the same manner as that used in Experiment Example 1 except that no tungsten oxide ($WO_3$) was added in the preparation of a positive electrode active material and a positive electrode containing no tungsten compound was prepared.

The cell prepared as described above is hereinafter referred to as Battery B1.

(Experiment Example 3)

[Preparation of Positive Electrode]

Lithium hydroxide (LiOH) was mixed with a nickel cobalt aluminium composite oxide represented by $Ni_{0.94}Co_{0.03}Al_{0.03}O_2$ such that the ratio of lithium element to the sum of the molar amounts of metal elements in the nickel cobalt aluminium composite oxide was 1.03. Furthermore, tungsten oxide ($WO_3$) was added and was mixed such that the amount of $WO_3$ was 0.15 mole percent with respect to the sum of the molar amounts of the metal elements, excluding lithium, in the nickel cobalt aluminium composite oxide in terms of tungsten element. The obtained mixture was fired at 750° C. in an oxygen atmosphere, whereby a positive electrode active material made of lithium nickel-cobalt-aluminate represented by $LiNi_{0.94}Co_{0.03}Al_{0.03}O_2$ containing a tungsten compound was obtained.

A cell was prepared in substantially the same manner as that used in Experiment Example 1 except that the positive electrode active material obtained as described above was used. The cell prepared as described above is referred to as Battery A2.

(Experiment Example 4)

A cell was prepared in substantially the same manner as that used in Experiment Example 3 except that no tungsten oxide ($WO_3$) was added in the preparation of a positive electrode active material and a positive electrode containing no tungsten compound was prepared.

The cell prepared as described above is referred to as Battery B2.

(Experiment Example 5)

A cell was prepared in substantially the same manner as that used in Experiment Example 3 except that a positive electrode active material made of lithium nickel-cobalt-aluminate represented by $LiNi_{0.88}Co_{0.09}Al_{0.03}O_2$ containing a tungsten compound was obtained using a nickel cobalt aluminium composite oxide represented by $Ni_{0.88}Co_{0.09}Al_{0.03}O_2$ instead of the nickel cobalt aluminium composite oxide represented by $Ni_{0.94}Co_{0.03}Al_{0.03}O_2$ in the preparation of the positive electrode active material.

The cell prepared as described above is hereinafter referred to as Battery B3.

(Experiment Example 6)

A cell was prepared in substantially the same manner as that used in Experiment Example 5 except that no tungsten oxide ($WO_3$) was added in the preparation of a positive electrode active material and a positive electrode containing no tungsten compound was prepared.

The cell prepared as described above is hereinafter referred to as Battery B4.

(Experiment)

(Calculation of Rated Capacity)

At a temperature of 25° C., each of Batteries A1, A2, and B1 to B4 was charged to 4.3 V (vs. Li/Li$^+$) at a current density of 0.2 mA/cm$^2$ in a constant current mode, was charged at a constant voltage of 4.3 V (vs. Li/Li$^+$) in a constant voltage mode until the current density reached 0.04 mA/cm$^2$, and was then discharged to 2.5 V (vs. Li/Li$^+$) at a current density of 0.2 mA/cm$^2$ in a constant current mode. In this operation, the rated capacity of each battery was determined in such a manner that the discharge capacity thereof was measured and the capacity per weight of the positive electrode active material was calculated.

(Calculation of Regeneration Value)

Next, after being charged to 90% of the above rated capacity (that is, until the state of charge SOC reached 90%) at a current density of 0.2 mA/cm$^2$, each of Batteries A1, A2, and B1 to B4 was charged at a temperature of 25° C. and a current of 0.08 mA/cm$^2$, 0.4 mh/cm$^2$, 0.8 mA/cm$^2$, and 1.6 mA/cm$^2$ for 10 seconds from the open circuit voltage. The voltage after 10 seconds was plotted against each current, whereby a current-voltage line was determined for each of Batteries A1, A2, and B1 to B4. The current Ip at a charge cut-off voltage of 4.3 V was determined from the current-voltage line. The regeneration value at 25° C. was calculated by the following equation:

$$\text{Regeneration value} = Ip \times 4.3 \qquad (1)$$

The regeneration value of Battery A1 is a relative value determined on the basis that the regeneration value of Battery B1, which is the same in the composition of the lithium transition metal oxide as Battery A1 and in which the positive electrode contains no tungsten compound, is 100%. Likewise, the regeneration value of each of Battery A2 and Battery B3 is a relative value determined on the basis that the regeneration value of a corresponding one of Battery B2 and Battery B4 is 100%. Results are shown in Table 1.

TABLE 1

| Battery | Lithium transition metal oxide | Addition method | Additive compound | Amount of added additive compound (mole percent) | Regeneration value (SOC 90%) (%) |
|---|---|---|---|---|---|
| A1 | $LiNi_{0.91}Co_{0.06}Al_{0.03}O_2$ | After firing | $WO_3$ | 0.15 | 112 |
| B1 | $LiNi_{0.91}Co_{0.06}Al_{0.03}O_2$ | — | Not used | — | 100 |

TABLE 1-continued

| Battery | Lithium transition metal oxide | Addition method | Additive compound | Amount of added additive compound (mole percent) | Regeneration value (SOC 90%) (%) |
|---|---|---|---|---|---|
| A2 | $LiNi_{0.94}Co_{0.03}Al_{0.03}O_2$ | During firing | $WO_3$ | 0.15 | 148 |
| B2 | $LiNi_{0.94}Co_{0.03}Al_{0.03}O_2$ | — | Not used | — | 100 |
| B3 | $LiNi_{0.88}Co_{0.09}Al_{0.03}O_2$ | During firing | $WO_3$ | 0.15 | 74 |
| B4 | $LiNi_{0.88}Co_{0.09}Al_{0.03}O_2$ | — | Not used | — | 100 |

As is clear from Table 1, in a comparison between Batteries A1 and B1, in which the percentage of Ni is 91 mole percent, Battery A1, in which the tungsten compound is contained in the positive electrode, has a larger regeneration value as compared to Battery B1, in which no tungsten compound is contained in the positive electrode. Likewise, in a comparison between Batteries A2 and B2, in which the percentage of Ni is 94 mole percent, Battery A2, in which the tungsten compound is contained in the positive electrode, has a larger regeneration value as compared to Battery B2, in which no tungsten compound is contained in the positive electrode. However, the regeneration value of Battery B3, in which the tungsten compound is contained in the positive electrode as is the case with Batteries A1 and A2 and the percentage of Ni is 88 mole percent, is not greater but less than the regeneration value of Battery B4, in which no tungsten compound is contained in the positive electrode.

This shows that the effect of enhancing the above-mentioned regenerative characteristics is an effect obtained by a configuration in which a lithium transition metal oxide with a Ni percentage of more than 90 mole percent is used and in which a tungsten compound is contained in a positive electrode. This enables both high capacity and high regeneration to be achieved by the effect of increasing the capacity by increasing the percentage of Mi and the effect of enhancing the regenerative characteristics. The reason why such results are obtained is unclear and is probably as described below.

In Batteries A1, A2, B1, and B2, the lithium transition metal oxide is in such a state that two hexagonal phases are present because the crystal structure transforms (phase transition) when the amount of Li in a Li site ranges from 0 to 0.3. The phase transition occurs at a high potential of 4.15 V to 4.25 V (vs. Li/Li$^+$) versus lithium.

In Batteries B1 and B2, since no tungsten compound is contained in the positive electrode or is present near the surfaces of particles of the lithium transition metal oxide, the positive electrode is held at a high potential because of the phase transition of the lithium transition metal oxide and therefore the oxidative degradation reaction of the nonaqueous electrolyte solution is promoted; hence, resistive coatings, composed of degradation products caused by the reaction, having poor lithium ion permeability are probably formed on the surfaces of the lithium transition metal oxide particles.

However, in Batteries A1 and A2, since the tungsten compound is contained in the positive electrode, even though the positive electrode is held at a high potential because of the phase transition of the lithium transition metal oxide, the tungsten compound present near the surfaces of the lithium transition metal oxide particles interact and react with the nonaqueous electrolyte solution; hence, good coatings having excellent lithium ion permeability are probably formed on the surfaces of the lithium transition metal oxide particles. As a result, it is conceivable that Batteries A1 and A2 have an increased regeneration value as compared to Batteries B1 and B2.

In Battery B3, since the time that the positive electrode is held at a high potential is shorter as compared to Batteries A1 and A2, even though the tungsten compound is contained in the positive electrode, the tungsten compound does not efficiently interact or react with the nonaqueous electrolyte solution; hence, it is conceivable that such good coatings having excellent lithium ion permeability as those obtained in Batteries A1 and A2 are not formed. In addition, in Battery B3, the tungsten compound unreacted as described above remains on the surface of the lithium transition metal oxide and probably serves as a resistive component. That is, when the percentage of Ni is 88 mole percent as is the case with Battery B3, an effect due to the fact that the tungsten compound is contained in the positive electrode is not obtained. As a result, if is conceivable that Battery B3 has reduced regenerative characteristics as compared to Battery B4.

Though Batteries A1 and A2 are different from each other in a method for allowing the positive electrode to contain the tungsten compound, it is clear that the effect of enhancing the regenerative characteristics is obtained by either method. This suggests that the tungsten compound needs only to be contained in the positive electrode and the method for allowing the positive electrode to contain the tungsten compound is not particularly limited. In a comparison between Batteries A1 and A2, Battery A2, which was prepared by a method of addition during firing, has a significantly increased regeneration value as compared to Battery A1, which was prepared by a method of addition after firing. This is probably because in Battery A1, the tungsten compound is attached to the surfaces of secondary particles of the lithium transition metal oxide and in Battery A2, the tungsten compound is attached not only to the surfaces of secondary particles of the lithium transition metal oxide but also to the insides of primary particles in the secondary particles. This shows that in the case of allowing the positive electrode to contain the tungsten compound, the tungsten compound is preferably attached to the surfaces of both of primary particles and secondary particles of the lithium transition metal oxide.

SECOND EXPERIMENT EXAMPLE (Experiment Example 7)

A cell was prepared in substantially the same manner as that used in Experiment Example 1 except that the content of a tungsten oxide ($WO_3$) contained in a positive electrode was 0.5 mole percent rather than 0.15 mole percent.

The cell prepared as described above is hereinafter referred to as Battery A3.

(Experiment Example 8)

A cell was prepared in substantially the same manner as that used in Experiment Example 1 except that the content of a tungsten oxide ($WO_3$) contained in a positive electrode was 1.5 mole percent rather than 0.15 mole percent.

The cell prepared as described above is hereinafter referred to as Battery A4.

(Experiment Example 9)

A cell was prepared in substantially the same manner as that used in Experiment Example 1 except that the content of a tungsten oxide ($WO_3$) contained in a positive electrode was 2.0 mole percent rather than 0.15 mole percent.

The cell prepared as described above is hereinafter referred to as Battery B5.

Batteries A3, A4, and B5 were measured for regeneration value as is the case with Batteries A1, A2 and B1 to B4. The regeneration value of each of Batteries A3, A4, and B5 is a relative value determined on the basis that the regeneration value of Battery B1, in which no tungsten compound is contained in the positive electrode, is 100%. Results are shown in Table 2 together with the results of Batteries A1 and B1.

TABLE 2

| Battery | Lithium transition metal oxide | Addition method | Additive compound | Amount of added additive compound (mole percent) | Regeneration value (SOC 90%) (%) |
|---|---|---|---|---|---|
| B1 | $LiNi_{0.91}Co_{0.06}Al_{0.03}O_2$ | — | Not used | — | 100 |
| A1 | $LiNi_{0.91}Co_{0.06}Al_{0.03}O_2$ | After firing | $WO_3$ | 0.15 | 112 |
| A3 | $LiNi_{0.91}Co_{0.06}Al_{0.03}O_2$ | After firing | $WO_3$ | 0.5 | 114 |
| A4 | $LiNi_{0.91}Co_{0.06}Al_{0.03}O_2$ | After firing | $WO_3$ | 1.5 | 112 |
| B5 | $LiNi_{0.91}Co_{0.06}Al_{0.03}O_2$ | After firing | $WO_3$ | 2.0 | 98 |

As is clear from Table 2, Batteries A1, A3, and A4, in which the content of the tungsten compound in the positive electrode is 0.15 mole percent, 0.5 mole percent, and 1.5 mole percent, respectively, have a larger regeneration value as compared to Battery B1, in which no tungsten compound is contained in the positive electrode. However, Battery B5, in which the content of the tungsten compound in the positive electrode is 2.0 mole percent, has a smaller regeneration value as compared to Battery B1, in which no tungsten compound is contained in the positive electrode. This shows that when the content of the tungsten compound in a positive electrode is too high, the effect of enhancing regenerative characteristics is not obtained.

THIRD EXPERIMENT EXAMPLE (Experiment Example 10)

A positive electrode active material made of lithium nickel-cobalt-aluminate containing a tungsten compound was obtained using lithium tungstate ($Li_2WO_4$) rather than, tungsten oxide ($WO_3$). A cell was prepared in substantially the same manner as that used in Experiment Example 1 except that the obtained positive electrode active material was used.

The cell prepared as described above is hereinafter referred, to as Battery A5.

(Experiment Example 11)

A positive electrode active material made of lithium nickel-cobalt-aluminate containing a molybdenum compound was obtained using molybdenum oxide ($MoO_3$) rather than tungsten oxide ($WO_3$). A cell was prepared in substantially the same manner as that used in Experiment Example 1 except that the obtained positive electrode active material was used.

The cell prepared as described above is hereinafter referred, to as Battery A6.

Batteries A5 and A6 were measured for regeneration value as is the case with Batteries A1, A2 and B1 to B4. The regeneration value of each of Batteries A5 and A6 is a relative value determined on the basis that the regeneration value of Battery B1, in which no tungsten is contained in the positive electrode, is 100%. Results are shown in Table 3 together with the results of Batteries A1 and B1.

TABLE 3

| Battery | Lithium transition metal oxide | Addition method | Additive compound | Amount of added additive compound (mole percent) | Regeneration value (SOC 90%) (%) |
|---|---|---|---|---|---|
| B1 | $LiNi_{0.91}Co_{0.06}Al_{0.03}O_2$ | — | Not used | — | 100 |
| A1 | $LiNi_{0.91}Co_{0.06}Al_{0.03}O_2$ | After firing | $WO_3$ | 0.15 | 112 |
| A5 | $LiNi_{0.91}Co_{0.06}Al_{0.03}O_2$ | After firing | $Li_2WO_4$ | 0.15 | 112 |
| A6 | $LiNi_{0.91}Co_{0.06}Al_{0.03}O_2$ | After firing | $MoO_3$ | 0.15 | 110 |

As is clear from Table 3, Battery A5, in which a compound contained in the positive electrode is lithium tungstate ($Li_2WO_4$), and Battery A6, in which a compound contained in the positive electrode is molybdenum oxide ($MoO_3$), as well as Battery A1, in which a compound contained in the positive electrode is tungsten oxide ($WO_3$), have a larger regeneration value as compared to Battery B1, in which none of these compounds is contained in the positive electrode. This shows that even though a tungsten compound contained in a positive electrode is a lithium composite oxide containing tungsten, an effect similar to an oxide containing tungsten is obtained. Furthermore, the above shows that even though a compound contained in a positive electrode is a molybdenum compound, an effect similar to a tungsten compound is obtained.

FOURTH EXPERIMENT EXAMPLE (Experiment Example 12)
[Preparation of Three-Electrode Test Cell]
A cell was prepared in substantially the same manner as that used in Experiment Example 1 except that the following solution was used: a nonaqueous electrolyte solution prepared in such a manner that a solvent mixture was prepared by mixing ethylene carbonate, ethyl methyl carbonate, and dimethyl carbonate at a volume ratio of 30:30:40, $LiPF_6$ was dissolved in the solvent mixture such that the concentration of $LiPF_6$ was 1.0 mole per liter, and 1 mass percent of lithium difluorophosphate serving as an additive was dissolved with respect to the mass of a nonaqueous electrolyte.

The cell prepared as described above is hereinafter referred to as Battery A7.
(Experiment Example 13)
A cell was prepared in substantially the same manner as that used in Experiment Example 12 except that the following solution was used: a nonaqueous electrolyte solution prepared by dissolving 1.0 mass percent of adiponitrile, serving as an additive, rather than lithium difluorophosphate with respect to the mass of a nonaqueous electrolyte.

The cell prepared as described above is hereinafter referred to as Battery A8.
(Experiment Example 14)
A cell was prepared in substantially the same manner as that used in Experiment Example 12 except that a nonaqueous electrolyte solution containing no lithium difluorophosphate was used.

The cell prepared as described above is hereinafter referred to as Battery A9.
(Experiment Example 15)
A cell was prepared in substantially the same manner as that used in Experiment Example 12 except that a positive electrode containing no tungsten compound was prepared in such a manner that no tungsten oxide ($WO_3$) was added in the preparation of a positive electrode active material.

The cell prepared as described above is hereinafter referred to as Battery B6.
(Experiment Example 16)
A cell was prepared in substantially the same manner as that used in Experiment Example 13 except that a positive electrode containing no tungsten compound was prepared in such a manner that no tungsten oxide ($WO_3$) was added in the preparation of a positive electrode active material.

The cell prepared as described above is hereinafter referred to as Battery B7.
(Experiment Example 17)
A cell was prepared in substantially the same manner as that used in Experiment Example 14 except that a positive electrode containing no tungsten compound was prepared in such a manner that no tungsten oxide ($WO_3$) was added in the preparation of a positive electrode active material.

The cell prepared as described above is hereinafter referred to as Battery B3.

Batteries A7 to A9 and B6 to B8 were calculated for regeneration value as is the case with Batteries A1, A2 and B1 to B4. The regeneration value of each of Batteries A7 to A9 and B6 to B8 is a relative value determined on the basis that the regeneration value of Battery B8, in which the positive electrode contains no tungsten and the nonaqueous electrolyte solution contains no additive such as lithium difluorophosphate or adiponitrile, is 100%. Results are shown in Table 4.

TABLE 4

| Battery | Lithium transition metal oxide | Addition method | Additive compound | Amount of added additive compound (mole percent) | Electrolyte additive | Regeneration value (SOC 90%) (%) |
|---|---|---|---|---|---|---|
| A7 | $LiNi_{0.91}Co_{0.06}Al_{0.03}O_2$ | After firing | $WO_3$ | 0.15 | Lithium difluorophosphate | 128 |
| A8 | $LiNi_{0.91}Co_{0.06}Al_{0.03}O_2$ | After firing | $WO_3$ | 0.15 | Adiponitrile | 111 |
| A9 | $LiNi_{0.91}Co_{0.06}Al_{0.03}O_2$ | After firing | $WO_3$ | 0.15 | Not used | 107 |
| B6 | $LiNi_{0.91}Co_{0.06}Al_{0.03}O_2$ | — | Not used | — | Lithium difluorophosphate | 97 |
| B7 | $LiNi_{0.91}Co_{0.06}Al_{0.03}O_2$ | — | Not used | — | Adiponitrile | 86 |
| B8 | $LiNi_{0.91}Co_{0.06}Al_{0.03}O_2$ | — | Not used | — | Not used | 100 |

As is clear from Table 4, in comparisons between Batteries A7 to A9, in which the positive electrode contains the tungsten compound, Battery A7, in which lithium difluorophosphate is contained in the electrolyte solution, and Battery A8, in which adiponitrile is contained in the electrolyte solution, have an increased regeneration value as compared to Battery A9, in which none of these compounds is contained in the electrolyte solution. This shows that regenerative characteristics can be further enhanced in such a manner that a lithium transition metal oxide with a Ni percentage of more than 90 mole percent is used; a positive electrode is allowed to contain a tungsten compound; and a nonaqueous electrolyte solution is allowed to contain an additive such as a lithium salt, including lithium difluorophosphate, containing a P—O bond in its molecule or a nitrile compound, including adiponitrile, containing a C—N bond in its molecule.

On the other hand, in comparisons between Batteries B6 to B8, in which the positive electrode contains no tungsten compound, Battery B6, in which lithium difluorophosphate is contained in the electrolyte solution, and Battery B7, in which adiponitrile is contained in the electrolyte solution, have a reduced regeneration value as compared to Battery B8, in which none of these compounds is contained in the electrolyte solution. This shows that the effect of enhancing regenerative characteristics by allowing an electrolyte solution to contain an additive such as a lithium salt containing a P—O bond in its molecule or a nitrile compound containing a C—N bond in its molecule is an effect characteristic of the case where a positive electrode contains a tungsten compound. The reason why such results are obtained is unclear and is probably as described below.

It is conceivable that in Batteries A7 and A8, an unsaturated bond contained in lithium difluorophosphate or adiponitrile reacts with the tungsten compound present near the surfaces of particles of the lithium transition metal oxide in a phase transition region of 4.15 V to 4.25 V (vs. Li/Li$^+$) to form good coatings having both electronic conductivity and lithium ion permeability on the surfaces of the lithium transition metal oxide particles.

INDUSTRIAL APPLICABILITY

An embodiment of the present invention can be expected to be applied to, for example, driving power supplies for mobile data terminals such as mobile phones, notebook personal computers, and smartphones; driving power supplies for high-power/high-regeneration applications such as electric vehicles, HEVs, and electric tools; and power supplies associated with power storage.

REFERENCE SIGNS LIST

10 Three-electrode test cell
11 Working electrode (positive electrode)
12 Counter electrode (negative electrode)
13 Reference electrode
14 Nonaqueous electrolyte solution

The invention claimed is:

1. A nonaqueous electrolyte secondary battery comprising a positive electrode, a negative electrode, and a nonaqueous electrolyte,
   wherein the positive electrode contains a lithium transition metal oxide, having a layered structure, containing at least Ni and also contains a tungsten compound and/or a molybdenum compound;
   the percentage of Ni is greater than 90.00 mole percent with respect to the sum of the molar amounts of metal elements, excluding lithium, in the lithium transition metal oxide;
   the amount of the tungsten compound and/or the molybdenum compound is 0.1 mole percent to 1.5 mole percent with respect to the sum of the molar amounts of the metal elements, excluding lithium, in the lithium transition metal oxide in terms of tungsten element and/or molybdenum element; and
   wherein the lithium transition metal oxide is represented by the formula $Li_aNi_xM_{1-x}O_2$ (where $0.95 \leq a \leq 1.20$, $0.94 \leq x$, and M is at least one element selected from Co, Mn, and Al),
   wherein the nonaqueous electrolyte contains a lithium salt containing a P—O bond in its molecule and a nitrile compound.

2. The nonaqueous electrolyte secondary battery according to claim 1, wherein the lithium transition metal oxide is composed of secondary particles formed by the aggregation of primary particles and
   the tungsten compound and/or the molybdenum compound is attached to the surfaces of at least either of the primary particles and secondary particles of the lithium transition metal oxide.

3. The nonaqueous electrolyte secondary battery according to claim 2, wherein the tungsten compound and/or the molybdenum compound is attached to the surfaces of the primary particles and secondary particles of the lithium transition metal oxide.

4. The nonaqueous electrolyte secondary battery according to claim 1, wherein the tungsten compound and/or the molybdenum compound is at least one compound selected from oxides and lithium composite oxides.

5. The nonaqueous electrolyte secondary battery according to claim 1, wherein the phase transition of the lithium transition metal oxide occurs at a potential of 4.15 V (vs. Li/Li+) to 4.25 V (vs. Li/Li+).

6. The nonaqueous electrolyte secondary battery according to claim 1, wherein the lithium transition metal oxide is represented by the formula $Li_aNi_xCo_yAl_zO_2$ (where $0.95 \leq a \leq 1.20$, $0.90 < x$, $0 < y < 0.10$, and $0 < z < 0.10$).

7. The nonaqueous electrolyte secondary battery according to claim 1, wherein the lithium salt containing the P—O bond in its molecule is lithium difluorophosphate.

8. The nonaqueous electrolyte secondary battery according to claim 1, wherein the nitrile compound is adiponitrile.

9. The nonaqueous electrolyte secondary battery according to claim 1, wherein the positive electrode contains the tungsten compound.

10. The nonaqueous electrolyte secondary battery according to claim 9, wherein the lithium transition metal oxide is composed of secondary particles formed by aggregation of primary particles and the tungsten compound is attached to an outer surface of at least one of the primary particles or the secondary particles.

11. The nonaqueous electrolyte secondary battery according to claim 10, wherein the tungsten compound is attached to the outer surface of the primary particles and the secondary particles.

12. The nonaqueous electrolyte secondary battery according to claim 9, wherein the tungsten compound is at least one compound selected from oxides and lithium composite oxides.

13. The nonaqueous electrolyte secondary battery according to claim 1, wherein the lithium transition metal oxide is represented by the formula $LiNi_{0.94}Co_{0.03}Al_{0.03}O_2$.

* * * * *